United States Patent
Morbi et al.

(10) Patent No.: US 9,255,366 B2
(45) Date of Patent: Feb. 9, 2016

(54) CONCRETE SCREED WITH RECYCLED RUBBER FROM DISCARDED TYRES

(71) Applicant: Italcementi S.p.A., Bergamo (IT)

(72) Inventors: Alessandro Morbi, Bergamo (IT); Marcello Antonio Molfetta, Mesagne-Brindisi (IT); Sara Sgobba, Bergamo (IT)

(73) Assignee: Italcementi S.p.A, Bergamo (IT)

( * ) Notice: Subject to any disclaimer, the term of this patent is extended or adjusted under 35 U.S.C. 154(b) by 0 days.

(21) Appl. No.: 14/242,946

(22) Filed: Apr. 2, 2014

(65) Prior Publication Data

US 2014/0308077 A1 Oct. 16, 2014

(30) Foreign Application Priority Data

Apr. 11, 2013 (IT) ................. MI2013A0575

(51) Int. Cl.

| | |
|---|---|
| *E01C 19/42* | (2006.01) |
| *C04B 18/12* | (2006.01) |
| *C04B 18/22* | (2006.01) |
| *C04B 28/02* | (2006.01) |
| *C04B 111/50* | (2006.01) |
| *C04B 111/52* | (2006.01) |
| *C04B 111/60* | (2006.01) |

(52) U.S. Cl.
CPC ............. *E01C 19/42* (2013.01); *C04B 18/12* (2013.01); *C04B 18/22* (2013.01); *C04B 28/02* (2013.01); *C04B 2111/503* (2013.01); *C04B 2111/52* (2013.01); *C04B 2111/60* (2013.01); *C04B 2201/52* (2013.01); *Y02W 30/96* (2015.05)

(58) Field of Classification Search
CPC ......... E01C 9/002; E01C 9/001; E01C 23/01; E01C 19/42; E04G 21/10; E04F 21/04; C04B 18/12; C04B 18/22; C04B 28/02; C04B 2111/503; C04B 2111/52; C04B 2111/60; C04B 2201/52

See application file for complete search history.

(56) References Cited

U.S. PATENT DOCUMENTS

| | | | | | |
|---|---|---|---|---|---|
| 3,025,772 | A | * | 3/1962 | Palatini | ............................ 404/18 |
| 4,707,955 | A | * | 11/1987 | Clapson | ............................ 52/98 |
| 4,909,002 | A | * | 3/1990 | Clifton et al. | ................... 52/100 |
| 5,425,904 | A | | 6/1995 | Smits | |
| 5,456,751 | A | | 10/1995 | Zandi | |
| 6,333,373 | B1 | * | 12/2001 | Rouse | ........................ B01J 2/00 523/335 |

(Continued)

FOREIGN PATENT DOCUMENTS

| | | |
|---|---|---|
| AT | 189 553 B | 4/1957 |
| BR | PI0400089 A | 12/2005 |

(Continued)

OTHER PUBLICATIONS

Shaheen et al, "Evaluating the Effects of Fine Rubber Aggregate on Concrete Performance", HBRC Journal, vol. 6, No. 1, Apr. 2010, pp. 1-16.

(Continued)

*Primary Examiner* — Abigail A Risic
(74) *Attorney, Agent, or Firm* — Florek & Endres PLLC

(57) ABSTRACT

It is disclosed a concrete screed with recycled rubber from discarded tyres (PFU), comprising cement, pre-treated recycled rubber from discarded tyres, with particle size comprised between 0.1 and 20 mm, preferably between 1 and 10 mm, still more preferably between 2 and 5 mm, pre-treated, inert materials, polymeric additives and water.

11 Claims, 5 Drawing Sheets

(56) References Cited

U.S. PATENT DOCUMENTS

| | | | |
|---|---|---|---|
| 6,476,136 B1* | 11/2002 | Swarup | C08F 18/10 525/191 |
| 7,192,216 B2* | 3/2007 | Casale | 404/118 |
| 2003/0068469 A1* | 4/2003 | Aschenbeck | D06N 5/00 428/150 |
| 2010/0098489 A1* | 4/2010 | Pollack | 404/118 |
| 2010/0167013 A1* | 7/2010 | Cruz | B32B 27/08 428/147 |

FOREIGN PATENT DOCUMENTS

| | | |
|---|---|---|
| BR | PI0602219 A | 12/2007 |
| CA | 2593865 A1 | 1/2009 |
| DE | 20 201 682 A1 | 11/1971 |
| EP | 1686102 A2 | 8/2006 |
| WO | 2006/042461 A1 | 4/2006 |

OTHER PUBLICATIONS

Asdrubali et al, "Lightweight Screeds Made of Concrete and Recycled Polymers: Acoustic, Thermal, Mechanical and Chemical Characterization," Forum Acusticum 2011—Aalborg, Denmark, Jul. 2, 2011, pp. 821-826.

Eldin et al, "Rubber-Tire Particles as Concrete Aggregate," Journal of Materials in Civil Engineering, vol. 5, No. 4, Nov. 2, 1993, pp. 478-496.

Rostami et al, "Use of Recycled Rubber Tires in Concrete," Proceedings of the International Conference on Concrete 2000, University of Dundee, Scotland, UK, Jan. 1, 1993, pp. 391-399.

Roesky, Rainer, "Italian Search Report and Written Opinion for ITMI20130575," Italian Patent and Trademark Office (UIBM), Dec. 12, 2013.

Database Chemical Abstracts, Chemi [Online] Jun. 29, 1987, Bezdecka, L; et al.: "compositions for monolithic floor layers with special effects", XP000319265, retrieved from Chemical Database accession No. 215646h & CS 235 413 B1 (Bezdecka Ludvik; Sequens Jan) May 15, 1985.

\* cited by examiner

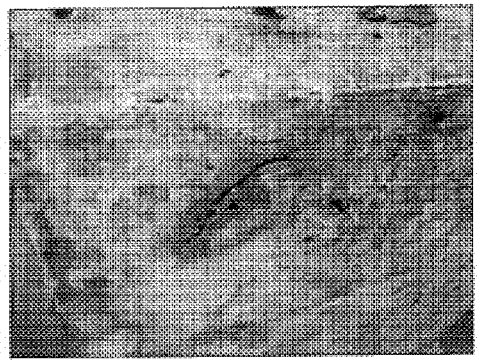
FIG.5a
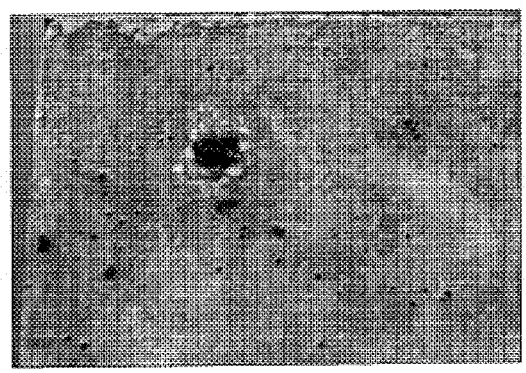
FIG.5b
FIG.5c
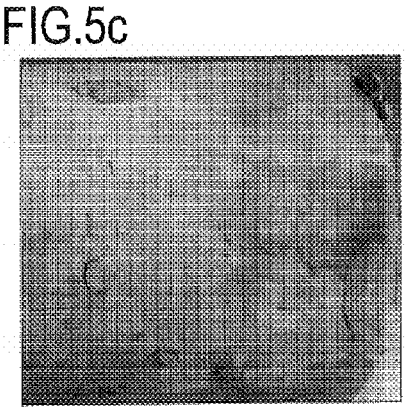
FIG.5d

CONCRETE SCREED WITH RECYCLED RUBBER FROM DISCARDED TYRES

FIELD OF THE INVENTION

The present invention refers to a concrete screed with recycled rubber from discarded tyres, which allows an effective reduction of footstep noise.

In particular, such a screed is provided with specific properties of acoustic isolation and thermal conductivity.

BACKGROUND OF THE INVENTION

The state of the art already describes the use of discarded tyres in concrete. Indeed, the requirement to search alternative uses to the rubber derived from discarded tyres (PFU), met the need of improving some characteristics of the mixtures of concrete. Indeed, according to the applications to which it is destined, the concrete shall have a low specific weight, a high strength and resistance to impact. The concrete as such, although it is the most used building material, not always satisfies all these requisites contemporaneously.

It has been thus developed in the state of the art the use of rubber particles derived from PFU as constituent in the concrete, with use of the product thus obtained in the achievement of cement sound absorbing products for road applications. More recently, the particles of recycled rubber have been used in the mixtures of concrete, still in replacement of aggregates based on inert materials, to obtain a light concrete.

In particular, within the technical literature, under the wording "Rubber Concrete" (concrete with rubber) or "Rubber Modified Concrete" (concrete modified with rubber) it is usual to indicate a mixture composed of ordinary concrete (Portland cement), natural aggregates and rubber from discarded tyres. Under the wording "Rubber mortar" it is intended to indicate the mixture of cement mortar with rubber.

The rubber used for such applications derives from post-consuming tyres of vehicles or trucks subjected to treatments of mechanical grinding or to cryogenic processes. Moreover, according to applications and performances required to the end-product, the rubber has been used "as such" or in some cases it has been previously treated, removing the textile component therefrom or pulling out the steel fibres. In other cases, the surface of rubber has been subjected to some pre-treatments to reinforce the adhesion between cement paste and rubber, achieving a marked improvement of some of the final properties of concrete. An example of said pre-treatment is a surface treatment of rubber with sodium hydroxide, which increases the adhesion between particles of rubber and cement matrix, translating thus in a substantial improvement of wear resistance and bending resistance.

In general, rubber aggregates have been used only as partial substitution of natural aggregates inside the mixture of concrete.

According to the state of the art, the addition of particles of rubber of discarded tyres leads to a reduction of physical and mechanical properties of the starting concrete, but at the same time leads to a great capability of plastic energy absorption. The decrease of mechanical properties is proportional to the increase of the fraction by volume of rubber according to a non-linear relationship.

Through addition of rubber, the concrete becomes relatively ductile and, if subjected to loading, behaves as an elastic structure.

Moreover, concrete with particles of rubber (in substitution of an amount between 10% and 30% by weight of the aggregate in inert materials) present coefficients of thermal conductivity and sound absorption greater than those of a traditional concrete.

Basing on the above highlighted properties, the concrete with recycled rubber can be used in architectural applications, in road paving wherein high mechanical resistances are not required, in panels requiring a low specific weight, in elements for construction and Jersey barriers subjected to impacts, in sound barriers (sound absorbing) and in construction of railroads to fasten the rails to the ground.

Examples of such applications are disclosed in patent applications WO2009035743, WO2000027774 and RU-A-2353603, relating to cement mixtures, rubber particles and natural aggregates, respectively, for general uses for concrete with latex, cement panels and mortars, for applications of radiation shielding and for uses as perimeter walls with blocks made of light concrete.

The need to seek alternative uses to the rubber deriving from discarded tyres (PFU) met nowadays with the need to improve some characteristics of the mixtures of concrete in order to make it a material capable to adsorb the energy developed by dynamic actions (impacts and vibrations).

It arose thus the interest in the achievement of screeds based on concrete containing aggregates in PFU rubber.

The conventional screed, pursuant to UNI EN 13813, is that horizontal construction element adopted, for example, to level a surface, making it perfectly flat, for distributing the load of the overlying elements and/or for receiving the final paving. The screed is a construction element with a variable thickness depending on the type of environment and purpose to which it is destined (for example inside a building it may have a thickness from 4 to 20 cm).

The conventional screed is usually obtained through the use of at least three materials used in appropriate amounts: cement, inert materials (sand and/or grit, for example) and water. Possibly, super-fluidifiers or aerating additives may be added. The dosage of the various elements varies according to the type of environment and to the destination of the screed (internal or external, for industrial or civil purposes). Much often other components are present, such as polystyrene, used to lighten the screed, or quartz, used to make the screed smoother and stronger. A screed laid adhering to a load-bearing substrate (for example a loft), on a desolidarisation layer (for example barrier to vapour) or on a layer of thermal and/or acoustic insulation, is defined respectively as "adherent", "desolidarised" or "floating". A screed may also incorporate a floor heating/cooling system and, in that case, it is defined "radiant".

The obtainment of the screed shall thus ensure mainly:
the achievement of a support suitable for the laying of the planned pavement;
that the laying occurs in the required timeframe;
that the lasting of the construction work under the various operating conditions (inside or outside, in paves for civil, commercial or industrial use, etc.) is not jeopardized.

The aim of the present invention is therefore that of proposing a screed capable to meet at the same time the above said thermal/mechanical features, ensuring also a noise reduction and adsorption of vibrational energy, in particular a reduction of the noise from footsteps, overcoming thus the drawbacks of the products according to the prior art.

A further aim of the present invention is the use of said screed in applications requiring a reduced noise from footsteps.

SUMMARY OF THE INVENTION

Subject-matter of the present invention is a concrete screed with recycled rubber from discarded tires (PFU), comprising cement, recycled rubber from discarded tires pre-treated, with a grain size between 0.1 and 20 mm, preferably between 1 and 10 mm, still more preferably between 2 and 5 mm, inert materials, polymeric additives and water; wherein said conglomerate presents Compression strength greater than 5 MPa, preferably greater than 15 MPa, still more preferably greater than 20 MPa and modulus of elasticity greater than 10 GPa, preferably greater than 13 GPa.

A further object is the use of a concrete screed with a pre-treated rubber derived from discarded tyres, in applications for reduced noise from footsteps, in particular for paving.

It is subject-matter of the present invention also the use of pre-treated recycled rubber derived from discarded tyres as aggregate for concrete screeds.

The rubber recycled from discarded tyres (PFU), present in the concrete screed according to the present invention, is pre-treated by storage of PFU in water for a time period of at least 7 days, preferably more than 28 days, or by washing of PFU with latex.

The pre-treatment by storage of PFU in water is preferred.

A main advantage of the screed according to the present invention is its characterization by the fact that it presents at the same time excellent mechanical properties and a considerable reduction of the noise from footsteps. In this regard, it is observed that a material achieving an acoustic reduction by sound absorption is not necessarily characterized by the fact of reducing the noise from footsteps. Indeed, the sound wave vibrates in a different manner according to the means through which it propagates.

It is apparent that a concrete screed allowing a good acoustic reduction by sound absorption will be normally more efficient also in reducing the noise from footsteps, but at equal sound absorption, the behaviour of concrete screed with respect to the noise from footsteps can be surprisingly different.

More specifically, the screed according to the present invention provides the considerable advantage of reducing the noise from footsteps and, at the same time, good mechanical and thermal properties, without any retrogradation of resistance to compression with respect to the values after 28 days.

BRIEF DESCRIPTION OF THE DRAWINGS

The attached drawing figures are described as follows:

FIGS. 5a-5d are photographs of examples of fissuring and surface delamination in a comparative sample.

DETAILED DESCRIPTION OF THE PREFERRED EMBODIMENT

Figure 1A:
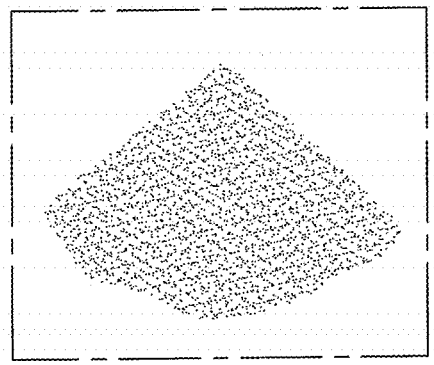
FIG. 1a is a schematic of a G0 class mono-granular sand and with roundish granules.

Under the term "cement" according to the present invention it is indicated a powder material which, mixed with water, forms a paste which hardens by hydration, and that, after hardening, maintains its resistance and stability also under water. In particular, the cements according to the present invention include the so-called Portland cement, slag cement, pozzolana cement, fly ash cement, calcined shale cement, limestone cement, the so-called composite cements and sulphoaluminate cement. For example, cements of type I, II, III, IV or V can be used according to the standard EN197-1. A particularly preferred cement is the CEM II cement. The preferred class of cement is the 42.5 class. The cement can be irrespectively grey or white.

Under the term "inert materials" or "aggregate of inert materials" according to the present invention is indicated generally granular materials used in the construction field (see also standards UNI EN 12620 and UNI EN 13055 (1)) which can be of the siliceous, limestone or basaltic type, round or crumbled.

The aggregate can be natural, industrial or recycled. The natural aggregate is an aggregate of mineral origin which has been univocally subjected to mechanical processing, whereas the industrial aggregate is always an aggregate of mineral origin deriving however from an industrial process, implying a thermal modification or of other kind. At last, the recycled aggregate is an aggregate resulting from the processing of an inorganic material previously used in the building field.

The tyres used in the screed according to the present invention derive from recycling and treatment of discarded tyres (PFU) of automobiles and trucks and are indicated as aggregates from PFU.

The discarded tyres are subjected to the following treatment for the production of aggregates from PFU: in a first phase it is carried out the grinding of the same and subsequently it follows a phase of sieving. The recycled rubber component present in the screed according to the present invention is subjected then to a further treatment wherein the grinded and sieved aggregate, with a particle size comprised between 0.1 and 20 mm, preferably between 1 and 10 mm, still more preferably between 2 and 5 mm, is stored in water for a period of time of at least 7 days, preferably more than 28 days, or it is subjected to washing with latex, before being mixed with cement, inert materials, polymeric additives and water.

In particular, the treatment with water is achieved according to the following procedure:

The recycled rubber aggregates (PFU) are stored in a pool;

The pool is thus filled with water in such amount that all the aggregates from PFU are totally soaked;

the aggregates from PFU are left in full immersion for a period of time comprised between 7 days and 40 days, preferably more than 28 days, and are then removed from the pool and directly used in the mixing with cement, inert materials, polymeric additives and water.

Alternatively to the treatment with water it is possible to subject the recycled rubber aggregates (PFU) to a treatment with latex:

the recycled rubber aggregates (PFU) are put in a tank cement mixer;
inside the cement mixer, in motion, is inserted latex in the liquid state in the amount necessary to wet all the PFU aggregates;
the possible exceeding latex is recovered through a sieve;
the PFU aggregates washed with latex are left to dry in a way that latex forms a waterproofing layer around them. This operation requires a few hours basing on the related dampness and temperature conditions.

The PFU aggregates have been split into three particle size classes.

In Table 1 are reported the main features of the three sizes.

TABLE 1

| Name of the particle size class | Particle Size data Mm |
|---|---|
| G0 | <1 |
| G1 | 3-5 |
| G20 | <20 |

Figure 1B:
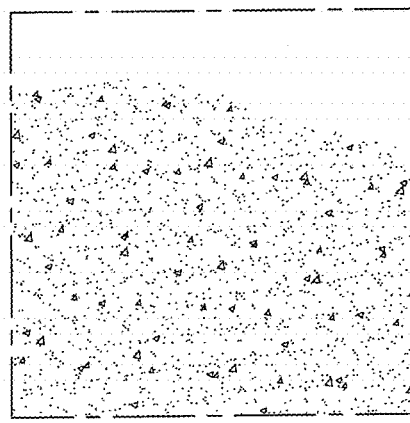
FIG. 1b is a schematic of a G1 class mono-granular sand with roundish granules.
Figure 1C:
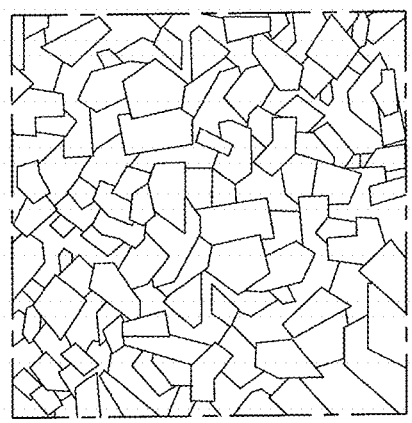
FIG. 1c is a schematic of a G20 class of mono-granular sand having a flattened form.

FIGS. 1a, 1b and 1c highlight how the G0 and G1 classes presents mono-granular sands and with roundish granules, whereas the G20 class presents a second-rate coefficient of form (flattened form).

For the production of the screed according to the present invention three particle size classes as above described have been used.

Preferably, the composition for achievement of the screed according to the present invention comprises from 5 to 30% by weight of cement, from 5 to 20% by weight of water, from 20 to 70% by weight of aggregates from inert materials, from 1 to 20% of aggregates from recycled rubber (PFU).

A preferred composition provides from 10 to 25% by weight of cement, from 8 to 15% by weight of water, from 40 to 70% by weight of aggregates from inert materials, from 1 to 20% of aggregates from recycled rubber (PFU).

The screed made of concrete according to the present invention does not necessarily require the addition of super-fluidizing additives/water reducers to obtain the desired results, although starting from water/cement ratios comprised between 0.45 and 1.2.

In case one would however use aerating and super-fluidizing additives, these can be selected from sulfonated naphthalene (SN), sulfonated melamine (SM), modified lignosulphonates (MLS), polycarboxylic compounds such as polyacrylates, or surfactants.

For a full homogenization, the cement, the water, the aggregate from inert materials and the aggregate from pre-treated PFU are mixed in a cement mixer or other similar apparatus, in appropriate proportions, up to obtain a homogeneous mixture void of lumps and with a proper consistency, preferably of the self-levelling type. The mixture is thus applied on the support by levelling it with a straightedge.

Once the mixture is ready, it is ideal to apply it within half an hour (time referred to a temperature of about 20° C.)

It requires then a ripening time of about 28 days, that is the common time of cement mixtures.

The main advantage of the screed according to the present invention is that it allows a considerable reduction of noise from footsteps.

Further features and advantages of the invention will be apparent from the following examples reported in an illustrative and not limitative manner.

Example 1 (Comparative)

A screed has been prepared through the composition reported as 1comp mixture in the following table 2. In the preparation of such a screed the aggregate made of rubber from PFU has not been subjected, before mixing with cement, water ad inert aggregates, to any treatment different from grinding and sieving up to the desired particle size.

TABLE 2

|  |  | 1comp Mixture |
|---|---|---|
| Sand (0-4) ($G_F$85 category according to EN 12620) | [Kg/m$^3$] | 1318 |
| PFU G1 Rubber Granule | [Kg/m$^3$] | 70 |
| CEM 42,5R II-A/LL Cement | [Kg/m$^3$] | 380 |
| Additive (Creactive Four, an acrylic super-fluidizer) | [Kg/m$^3$] | 4.0 |
| Water | [Kg/m$^3$] | 195 |
| Theoretical Volumic Mass | [Kg/m$^3$] | 1967 |

Figure 2:
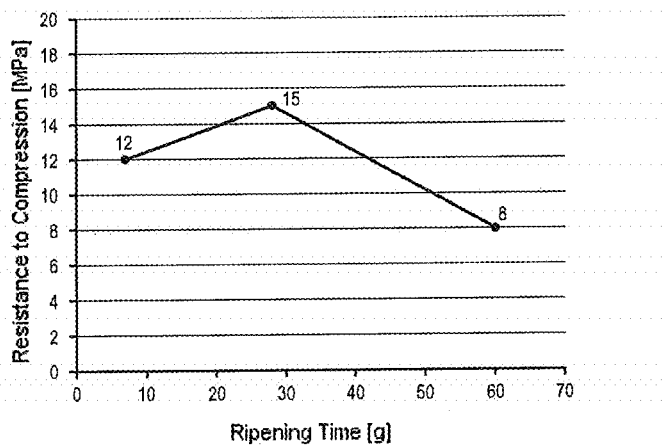
FIG. 2 is a graph of the trend of resistance to compression over the time.
Figure 3:
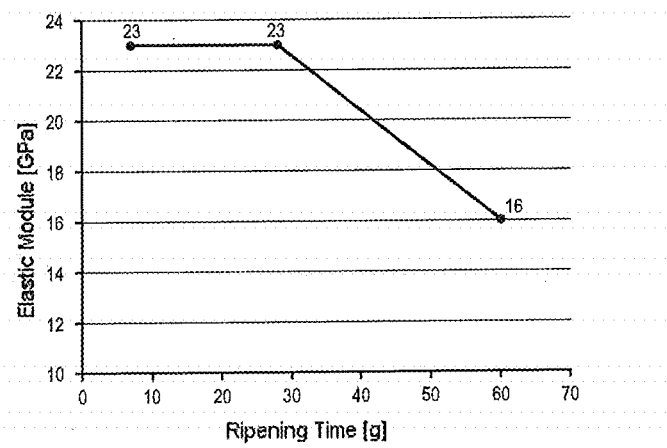
FIG. 3 is a graph of the trend of the elastic module over the time.
Figure 4:
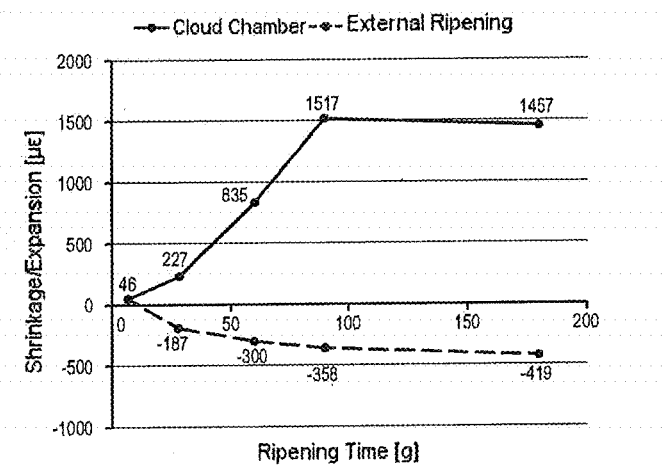
FIG. 4 is a graph comparing ripened specimens under different thermo-hygrometric conditions, showing a shrinkage/expansion effect

For said screed it was observed a problem of retrogradation of resistances which become apparent after the 28th day of ripening under conditions of great dampness. In the graphs reported into FIGS. 2-4 is shown how the mixture used above presents phenomena of retrogradation of resistance to compression and of the elastic module, as well as phenomena of onset of fissuring and surface delamination. More precisely, FIG. 2 illustrates the trend of resistance to compression over the time, FIG. 3 illustrates the trend of the elastic module over the time and FIG. 4, comparing ripened specimens under different thermo-hygrometric conditions, shows a shrinkage/expansion effect. Indeed, as seen from FIG. 4, the behaviour of concrete is definitely different if the same is put under much different thermo-hygrometric conditions. In case of environmental moisture greater than 95%, the sample of concrete tends to expand, whereas the same shrinks if put in an uncontrolled external environment. At last, in FIGS. 5a-5d are reported examples of fissuring and surface delamination.

The phenomena observed can be reasonably referred to expanding actions much probably due to formation of expanding products to the interface between cement matrix and rubber and/or effects of imbibition of rubber in an environment with great dampness.

Example 2

Two screeds have been prepared with the compositions reported as mixture 1 and mixture 2 in the following table 3. In the preparation of said screeds the aggregate made of PFU rubber has been subjected, before mixing with cement, water, polymeric additive and inert aggregates, to the pre-treatment of storage in water for a time period of 28 days, as previously described.

TABLE 3

|  |  | Mixture 1 | Mixture 2 |
|---|---|---|---|
| Sand (0-4) ($G_F$85 category according to EN 12620) | [Kg/m$^3$] | 1318 | 822 |
| Rubber Granule G1 | [Kg/m$^3$] | 70 | 160 |
| CEM 42,5R II-A/LL Cement | [Kg/m$^3$] | 380 | 313 |

TABLE 3-continued

|  |  | Mixture 1 | Mixture 2 |
|---|---|---|---|
| Additive (Creactive Four, an acrylic super-fluidizer) | [Kg/m³] | 4.0 | 3.3 |
| Water | [Kg/m³] | 195 | 161 |
| Theoretical Volumic Mass | [Kg/m³] | 1967 | 1518 |

In Table 4 are shown the main features of the screed obtained through the mixtures according to the present invention. The screed according to the present invention is put in comparison with:
- a commercial product into which are present plastic materials for reducing noise from footsteps, composed of sand (1100-1200 kg/m³), cement (430 kg/m³), water (290 kg/m³), additives (1-2 kg/m³) and particles of plastic material (70 kg/m³) coming from recycling of plastics;
- a conventional screed, that is, without the rubber aggregate in substitution of the natural aggregate.

The data relating to mixture 1 have been ascertained through an industrial test in the plant of Calcestruzzi SPA of Triggiano (BA).

TABLE 4

|  |  |  | Conventional Screed | Mixture 1 | Mixture 2 | Commercial Product |
|---|---|---|---|---|---|---|
| Slump-Flow 0' | UNI 11041 | [cm] | 60 | 60 | 60 | 60 |
| Fresh Volumic Mass | UNI EN 12350-6 | [Kg/m³] | 2100 | 1940 | 1680 | 1900 |
| Rc to 7 days | UNI EN 12390-3 | [MPa] | 15 | 18 | — | 14 |
| Rc to 28 days | UNI EN 12390-3 | [MPa] | 20 | 22 | 6 | 16 |
| Dynamic Elastic Mod. to 28 days | UNI 9771 | [GPa] | 25 | 20 | 13 | 12 |
| Hardened Volumic Mass to 28 days | UNI EN 12390-7 | [Kg/m³] | 2100 | 1920 | 1640 | 1890 |
| Thermal Conductivity | UNI EN 12664 | [W/mK] | 1.2 | 1.2 | 0.9 | 1.2 |
| Noise Reduction from Footsteps ΔLw | EN ISO 10140-1 | [dB] | 2-4 | 16 | 19 | 13 |

Figure 6:
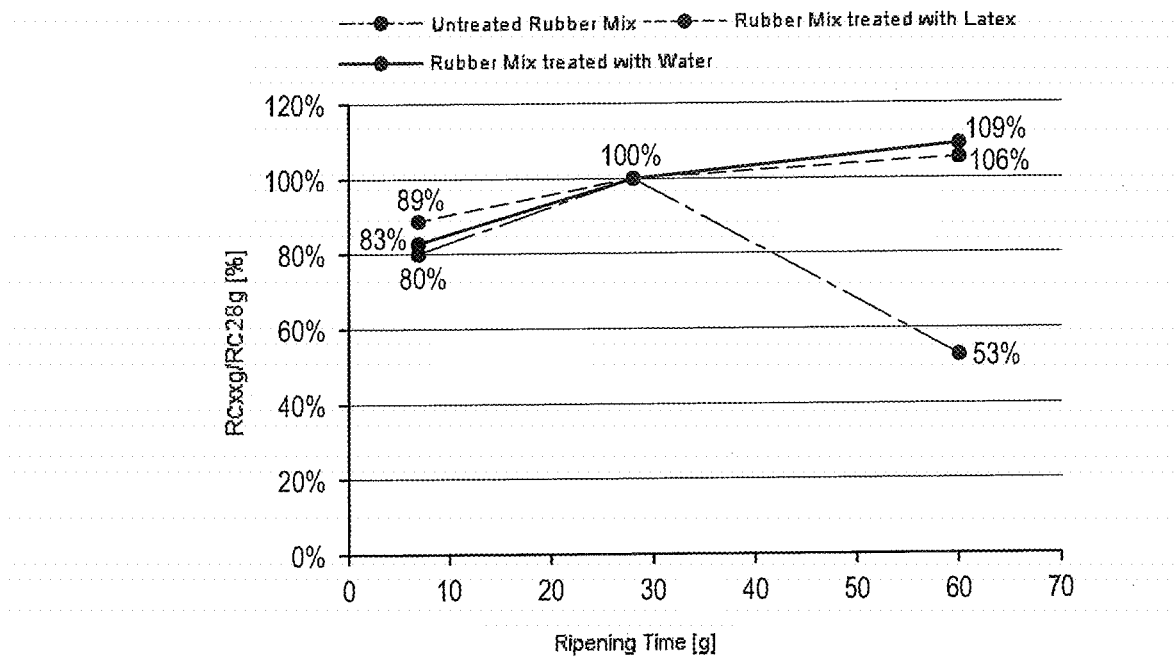
FIG. 6 is graph of the trend of resistances to compression (in percentage on the value to 28 days) of the 1comp mixture indicated in table 2, without pre-treated PFU rubber aggregates, and of mixture 1 indicated in table 3, with PFU rubber aggregates pre-treated with water for 28 days, and of mixture 1 indicated in table 3, with PFU rubber aggregates treated with latex

In FIG. 6 the graph illustrates the trend of resistances to compression (in percentage on the value to 28 days) of the 1comp mixture indicated in table 2 (not pre-treated PFU rubber aggregates), and of mixture 1 indicate in table 3, wherein the PFU rubber aggregates have been pre-treated with water for 28 days, and of mixture 1 indicated in table 3, wherein the PFU rubber aggregates have been treated with latex. The graph of FIG. 6 shows how the treatment of PFU rubber aggregates with water or with latex provided according to the present invention allows to avoid expansion problems and thus of fissuring observed for the 1comp mixture, with untreated aggregates.

The above reported data highlight that a conventional screed possesses a low capability of reducing noise from footsteps also due to the high elastic module.

The mixture 1 according to the present invention presents values of reduction of noise from footsteps which are greater than those of the commercial product, although having a high resistance to compression and high elastic module.

The mixture 2 according to the invention presents optimal mechanical characteristics for applications wherein it is not required a Rc minimum value greater than 5 MPa. The reduction of the noise from footsteps results higher than that of other materials and the low elastic module allows the material to bear great deformations before fissuring. Moreover, the relative lightness of the material reduces the permanent loads on the structure.

In particular, the above tested mixtures 1 and 2 are optimized for the production of screeds capable of satisfying performing requisites determined by commercial, technical and regulatory requirements, reported in table 5.

TABLE 5

|  |  | Mixture 1 | Mixture 2 |
|---|---|---|---|
| Volumic Mass (VM) | [Kg/m³] | 1600 < MV < 2000 | MV < 1700 |
| Resistance to compression (RC) | [MPa] | RC > 15 | RC > 5 |
| Noise Reduction from Footsteps ΔLw | [dB] | ΔLw > 10 | ΔLw > 10 |
| Type of laying | — | Coupled to Sound Absorbing Pad | Coupled to Sound Absorbing Pad |

Example 3

Two screeds have been prepared having the same composition reported in the following table 6. In the preparation of said screeds the rubber aggregate has been subjected, before mixing with cement, water, polymeric additive and inert aggregates, to a pre-treatment of storage in water for a time period of 7 days in the first case (mixture 1) and for a time period of 28 days in the second case (mixture 2).

TABLE 6

|  |  | Mixture 1 | Mixture 2 |
|---|---|---|---|
| Sand (0-4) (G$_F$-85 category according to EN 12620) | [Kg/m³] | 938 | 938 |
| Rubber Granule G20 | [Kg/m³] | 150 | 150 |
| Grit (10-20 mm) | [Kg/m³] | 305 | 305 |
| CEM 42,5R II-A/LL Cement | [Kg/m³] | 395 | 395 |
| Super-fluidizing acrylic Additive | [Kg/m³] | 2.4 | 2.4 |
| Water | [Kg/m³] | 185 | 185 |
| Theoretical Volumic Mass | [Kg/m³] | 1975 | 1975 |

Figure 7:
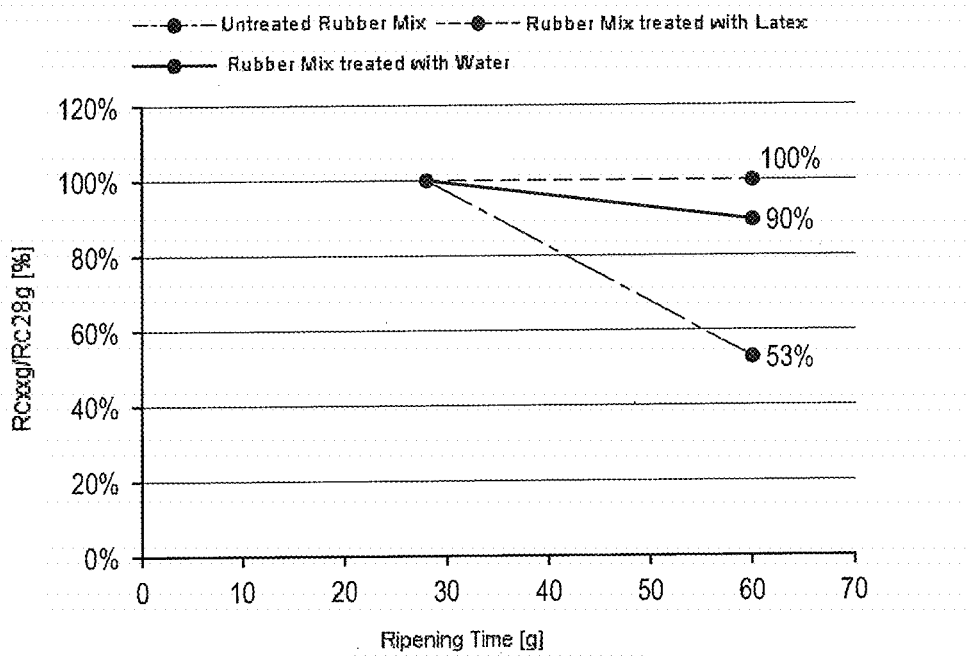
FIG. 7 is a graph showing the effects from the treatment of aggregates from PFU with water or latex in reducing the problem of expansion and fissuring for the referenced mixture, compared with untreated aggregates.
Figure 8:
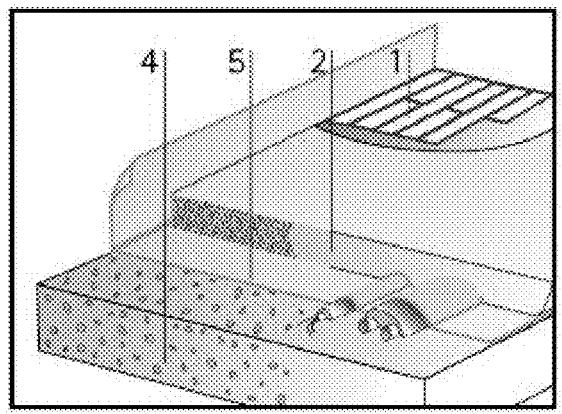
FIG. 8 is a cross-sectional perspective view of a concrete screed of the present invention installed over a load-bearing substrate in a common flooring application.

The graph of FIG. 7 illustrates how the treatment of the aggregates from PFU with water carried out for 7 days already reduces, although it does not completely eliminate the problem of expansion and thus of fissuring observed for the referenced mixture with untreated aggregates. Instead, the treatment of the aggregates from PFU with water, carried out for 28 days, completely eliminates the problem As illustrated in FIG. 8, the concrete screed 2 of the present invention may be used in a representative prior art application over a load bearing substrate 4. In FIG. 8, the screed 2 is applied on an insulation layer 5 (not required) over a load-bearing substrate 4, with a flooring layer applied over the screed 2. The load-bearing substrate 4 may be any suitable material, including but not limited to concrete, stone, brick, etc. The floor layer 1 may similarly be any suitable material, including but not limited to wood, tile, etc. Moreover, the screed 2 of the present invention may be used without an insulation layer 5, where the screed 2 of the present invention provides acoustic and/or thermal insulation.

The invention claimed is:

1. A concrete screed with recycled rubber from discarded tires (PFU), comprising cement, recycled rubber from discarded tires pre-treated, with a grain size between 0.1 and 20 mm, inert materials, polymeric additives and water; wherein said conglomerate presents Compression strength greater than 5 MPa and modulus of elasticity greater than 10 GPa, said recycled rubber from discarded tires (PFU) being pre-treated using PFU storage in water for between 7 days and 40 days or by washing of the PFU with latex.

2. The concrete screed according to claim 1, where the recycled rubber from discarded tires (PFU) is pre-treated by means of PFU storage in water, preferably for a time longer than 28 days.

3. The concrete screed according to claim 1, wherein the concrete mixture comprises from 5 to 30% by weight of cement, from 5 to 20% by weight of water, from 20 to 70% by weight of aggregates from inert materials, from 1 to 20% of aggregates from pre-treated recycled rubber (PFU).

4. The concrete screed according to claim 1, wherein the concrete mixture comprises from 10 to 25% by weight of cement, from 8 to 15% by weight of water, from 40 to 70% by weight of aggregates from inert materials, from 1 to 20% of aggregates from pre-treated recycled rubber (PFU).

5. Use of a concrete screed with recycled rubber from discarded tires according to claim 1, for applications having reduced walking impact noise, in particular for flooring.

6. Use of a concrete screed with recycled rubber from discarded tires according to claim 4, with reduction of the walking impact noise equal to $\Delta Lw > 10$ dB.

7. The concrete screed according to claim 1, wherein the PFU has a grain size between 1 and 10 mm.

8. The concrete screed according to claim 1, wherein the PFU has a grain size between 2 and 5 mm.

9. The concrete screed according to claim 1, wherein the compression strength is greater than 15 MPa.

10. The concrete screed according to claim 1, wherein the compression strength is greater than 20 MPa.

11. The concrete screed according to claim 1, wherein the modulus of elasticity is greater than 13 GPa.

\* \* \* \* \*